(12) United States Patent
Ma et al.

(10) Patent No.: US 7,348,756 B2
(45) Date of Patent: Mar. 25, 2008

(54) ADVANCED CURRENT CONTROL METHOD AND APPARATUS FOR A MOTOR DRIVE SYSTEM

(75) Inventors: Jack Ma, Mississauga (CA); George Zhou, Mississauga (CA); Zheng Wang, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 11/285,180

(22) Filed: Nov. 23, 2005

(65) Prior Publication Data

US 2006/0113954 A1 Jun. 1, 2006

Related U.S. Application Data

(60) Provisional application No. 60/631,543, filed on Nov. 30, 2004.

(51) Int. Cl.
*H02P 27/04* (2006.01)

(52) U.S. Cl. ............. 318/803; 318/798; 318/801; 318/432; 318/434

(58) Field of Classification Search ............. None
See application file for complete search history.

(56) References Cited

U.S. PATENT DOCUMENTS

| | | | |
|---|---|---|---|
| 4,554,501 A | 11/1985 | Baker | |
| 4,959,602 A | 9/1990 | Scott et al. | |
| 5,140,248 A | 8/1992 | Rowan et al. | |
| 5,298,847 A | 3/1994 | Kerkman et al. | |
| 5,537,308 A | 7/1996 | Gritter | |
| 5,594,634 A | 1/1997 | Rajashekara et al. | |
| 5,949,204 A | 9/1999 | Huggett et al. | |
| 6,198,176 B1 * | 3/2001 | Gillette | ............ 307/64 |
| 6,304,052 B1 | 10/2001 | O'Meara et al. | |
| 6,459,230 B1 | 10/2002 | Tao | |
| 6,541,937 B2 | 4/2003 | Kato | |
| 6,577,087 B2 | 6/2003 | Su | |
| 6,608,459 B2 | 8/2003 | Kasagami et al. | |
| 6,674,262 B2 | 1/2004 | Kitajima et al. | |
| 2003/0214266 A1 | 11/2003 | Cheng et al. | |

\* cited by examiner

*Primary Examiner*—Lincoln Donovan
*Assistant Examiner*—Erick Glass
(74) *Attorney, Agent, or Firm*—Birch, Stewart, Kolasch & Birch, LLP (57) ABSTRACT

An apparatus controls a power converter of an AC motor drive system, the power converter outputting multi-phase AC current to an AC motor. The apparatus comprises: a state selecting unit; and an advanced controller. The state selecting unit selects an operation mode, from among a plurality of operation modes, for the AC motor based on system real-time operating conditions, the plurality of operation modes including a normal mode, a power interruption mode, a fault protection mode, and a power-up/down dynamic mode. The system operating conditions include DC voltage available to the power converter, motor load condition, and motor speed command. The advanced controller controls multi-phase AC current output from the power converter to the motor in accordance with the operation mode selected by the state selecting unit. The advanced controller generates a current control reference value that is based on the selected operation mode to achieve current control under various operating conditions of the motor drive system.

21 Claims, 5 Drawing Sheets

ADVANCED CURRENT CONTROL METHOD AND APPARATUS FOR A MOTOR DRIVE SYSTEM

CROSS-REFERENCE TO RELATED APPLICATION

The present application claims priority under 35 U.S.C. §119(e) to U.S. Provisional Application No. 60/631,543, filed Nov. 30, 2004, which is incorporated by reference herein in its entirety.

FIELD OF THE INVENTION

The present invention relates to motor drive system technology, and more particularly to an advanced current control method and apparatus for a motor drive system for controlling motor operation under a variety of normal/abnormal operating conditions.

BACKGROUND OF THE INVENTION

Aerospace applications require more robust and more reliable motor drive systems with high power density and high operation efficiency (more compact in size and weight). These requirements are even more critical for the newly developing "more electrical aircraft", for its much higher electrical power ratings and much larger number of AC motor drive systems on board. A conventional AC motor drive system utilizes an inverter (e.g., a voltage source inverter) under control of a PWM (pulse width modulation) generator and switch driver to convert DC power to multi-phase AC power for supply to the motor. In a current control AC drive system, flux and torque producing current components (represented by direct-axis and quadrature-axis vectors Id and Iq, respectively) are controlled to achieve desired motor speed and torque over the entire speed range of the AC motor. Various conventional current control structures for a voltage source inverter-fed motor drive require sufficient voltage to maintain suitable current regulation over the entire operating speed range of the drive. This condition is not likely to be met in aerospace applications, because a voltage limitation will typically be exerted on the system to achieve maximum power density and efficiency. With such voltage constraints, not only will the system operating point drift off from the desired state, but the system may encounter stability problems when using a vector control method. The voltage limitation can also come from abnormally low DC bus or DC bus disturbances introduced by system dynamics, such as power interruptions. The system will typically experience other unexpected transient situations, e.g., caused by load dynamics or by noise, errors and spikes due to inverter, controller and motor non-idealities.

A conventional current controller uses only the speed regulator and start/stop processes as references. The conventional current controller shuts down the inverter gating (e.g., implemented using insulated gate bipolar transistors; "IGBTs") whenever any defined threshold is reached. To resume normal operation, the system typically must go through a start-up process when normal operating condition recovers, because the system has lost the control during the shutdown period. For a motor drive system using a sensorless control algorithm to determine rotor position/speed, this process may have to wait until the motor fully stops to be able to re-start. Another way to mitigate this issue is to increase the design margin. This means a trade-off with over-all system size and weight, however, which is undesirable.

SUMMARY OF THE INVENTION

In one aspect, the present invention is an apparatus for controlling a power converter of an AC motor drive system, the power converter outputting multi-phase AC current to an AC motor. The apparatus comprises: a state selecting unit for selecting an operation mode, from among a plurality of operation modes, for the AC motor based on system real-time operating conditions, the plurality of operation modes including a normal mode, a power interruption mode, a fault protection mode, and a power-up/down dynamic mode, the system operating conditions including DC voltage available to the power converter, motor load condition, and motor speed command; and an advanced controller for controlling multi-phase AC current output from the power converter to the motor in accordance with the operation mode selected by the state selecting unit, the advanced controller generating a current control reference value that is based on the selected operation mode to achieve current control under various operating conditions of the motor drive system.

According to another aspect, the present invention is a method of controlling a power converter of an AC motor drive system, the power converter outputting multi-phase AC current to an AC motor. The method comprises: selecting an operation mode, from among a plurality of operation modes, for the AC motor based on system real-time operating conditions, the plurality of operation modes including a normal mode, a power interruption mode, a fault protection mode, and a power-up/down dynamic mode, the system operating conditions including DC voltage available to the power converter, motor load condition, and motor speed command; and controlling multi-phase AC current output from the power converter to the motor in accordance with the selected operation mode, the step of controlling including generating a current control reference value that is based on the selected operation mode to achieve current control under various operating conditions of the motor drive system.

BRIEF DESCRIPTION OF THE DRAWINGS

Further aspects of the present invention will become apparent from the detailed description, taken in conjunction with the attached drawing sheets, in which.

DETAILED DESCRIPTION OF THE INVENTION

As will be described in detail below, an embodiment of the present invention performs advanced current control to effectively control a power inverter of an AC motor drive, using an intelligent control technique to optimize motor drive system operation under a variety of normal/abnormal operating conditions. An embodiment of the present invention recognizes and categorizes different system operating conditions, and chooses an operation mode based on these operating conditions so that the motor controller can effectively and dynamically operate to satisfy motor system performance requirements. Using this control technique, the motor drive system operation is optimized, robust, and reliable.

Figure 1:
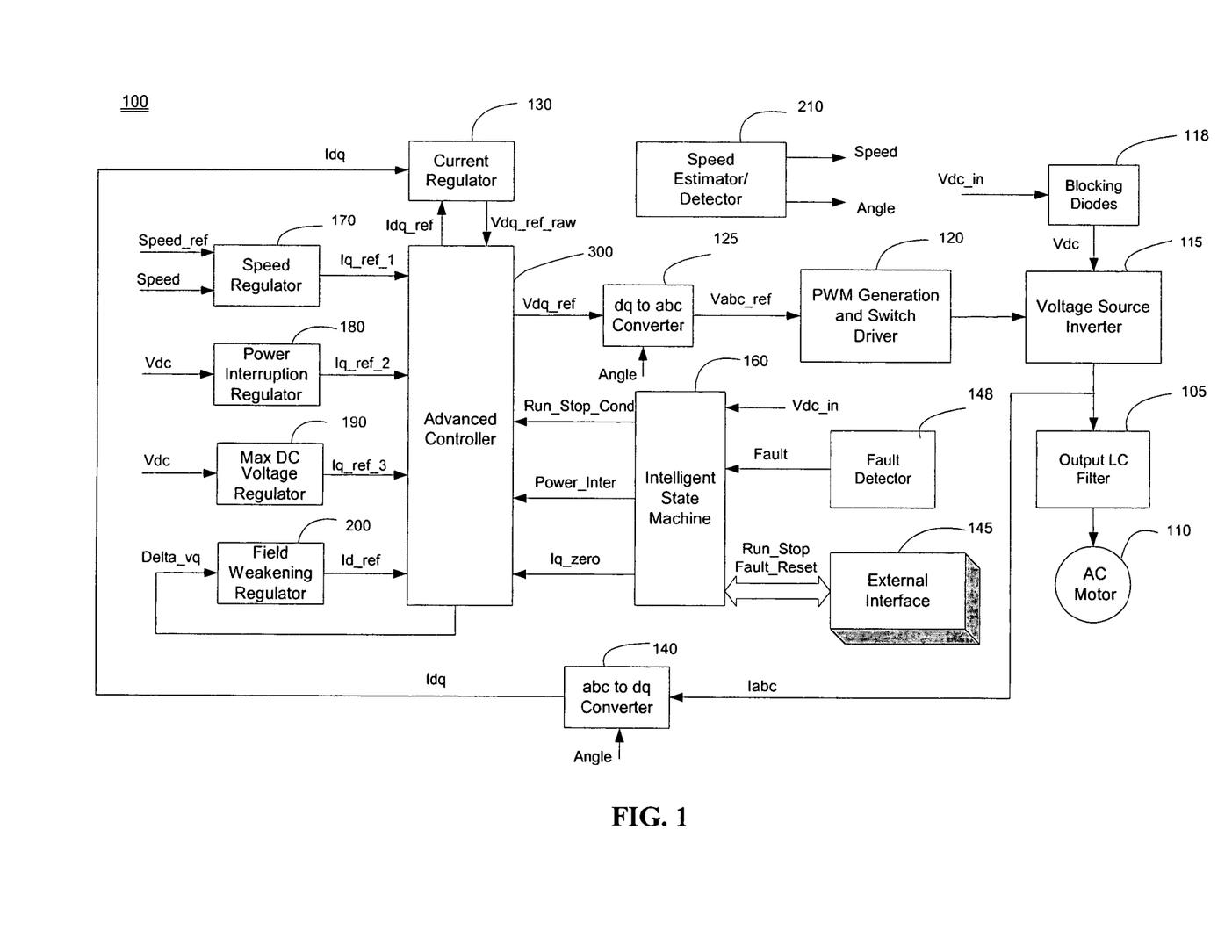
FIG. 1 is a block diagram illustrating an arrangement for advanced current control in a typical AC motor drive system in accordance with an embodiment of the present invention.

FIG. 1 is a block diagram illustrating an AC motor drive system in which principles of the present invention are applied to achieve advanced current control according to an embodiment of the present invention. An exemplary environment for this embodiment is an aircraft motor system, although it should be recognized that principles of the present invention are not limited to such an environment. As illustrated in FIG. 1, the AC motor drive system 100 includes the following main components: an AC motor 110; a voltage source inverter 115; a pulse width modulation (PWM) generator and switch driver 120; a current regulator 130; an intelligent state machine 160; and an advanced controller 300. The motor drive system 100 may further include an output LC filter 105 between the voltage source inverter 115 and the AC motor 110. The AC motor drive system 100 further includes: an external interface 145; a fault detector 148; a speed regulator 170; a power interruption regulator 180; a max dc link voltage regulator 190; a field weakening regulator 200; a motor speed estimator/detector 210; and an input blocking diode 118. The AC motor 110 may be a three-phase permanent magnet synchronous motor, although principles of the present invention are not limited to such a motor type.

The advanced controller 300 controls the voltage source inverter 115 via the PWM generation and switch driver 120 SO that the inverter 115 outputs the desired multi-phase AC power to the stator windings of motor 110. Thus, in general, the inverter 115 converts DC power, Vdc, from a power source (assumed to be a DC bus in this embodiment) into multi-phase AC power and supplies such multi-phase AC power to stator windings of the motor 110, creating a rotating magnetic field that interacts with the rotor's magnetic field to create torque. In the AC motor drive system 100 of FIG. 1, the voltage source inverter 115 converts DC power (e.g., 540 VDC from a DC bus) to a multi-phase current output to the AC motor 110 via the output LC filter 105, and may be implemented using a configuration of IGBTs, which are driven by the PWM generation and switch driver 120 to convert DC input, Vdc, to multi-phase current supplied to the AC motor 110. It should be realized that various inverter and switch driving techniques may be used.

The motor drive system 100 illustrated in FIG. 1 performs current control using d-axis and q-axis current vectors Id, Iq, and further includes: an abc to dq converter 140 to convert multi-phase line current values $i_a$, $i_b$, $i_c$ into Id, Iq vector values using well known Clarke and Park transforms; and a dq to abc converter 125 for converting d-axis and q-axis control reference voltages Vdq_ref output by the advanced controller 300 to multi-phase control reference voltages Vabc_ref. Motor drive control in the system of FIG. 1 is primarily performed by the advanced controller 300 and the intelligent state machine 160, which determines an operational state suitable for controlling the voltage source inverter 115 in the manner discussed below.

The motor drive system 100 includes a plurality of regulators, including the speed regulator 170, the power interruption regulator 180, the DC link voltage regulator 190, and the field weakening regulator 200. The speed regulator 170 generates a torque current reference, Iq_ref_1, based on a difference between a commanded motor speed (Speed_ref) and a feedback speed value from speed estimator/detector 210; the power interruption regulator 180 outputs a power interruption current reference, Iq_ref_2 during a power interruption mode; the max DC link voltage regulator 190 generates a voltage regulating current control reference, Iq_ref_3, during a transient state; the field weakening regulator 200 generates a field weakening current control reference, Id_ref, during a voltage limiting mode; a zero current mode unit residing in the state machine 160 provides a zero current reference, Iq_zero, to the advanced controller 300 in fault protection mode. The advanced controller 300 receives outputs from these regulators, including Iq_zero from the state machine, to generate a current control reference, Idq_ref, in a manner discussed below. Generally, the advanced controller provides the reference current Idq_ref for current regulator 130, and generates voltage command Vdq_ref for the PWM generator 120 based on a built-in optimization control algorithm and a protection mode command from the state machine.

Although the advanced controller 300, the state machine 160, and the various regulators in FIG. 1 are illustrated as discrete elements, it should be recognized that this illustration is for ease of explanation and that functions of these elements may be combined in one or more physical elements, e.g., in the one or more microcontrollers or in one or more application-specific integrated circuits (ASIC).

In a common control structure of a voltage source inverter, the current regulator outputs an inverter output voltage reference with a maximum value limitation predetermined from the specified lowest available voltage on the bus. This is a typical design based on the "worst case." With the advanced controller 300 of the FIG. 1 embodiment, the voltage limitation becomes a real time calculated value instead of a fixed value. The actual inverter output voltage reference, Vabc_ref, is provided to the PWM generation and switch driver 120 after applying this control scheme on the raw voltage demand, Vdq_ref_raw, generated by the current regulator 130.

This advanced control is based on knowledge of the dynamic DC bus voltage limitation according to an on-line calculation. This enables, for example, field weakening control automatically when the initial voltage demand from the current regulator 130 is approaching a limit, so that the saturation of current regulator 130 is avoided. The goal of the close loop field-weakening control is to provide a certain d-axis current (field generating component of motor stator current) to operate the system along the maximum available voltage track to maximize the voltage utilization. This will result in a minimum current operation.

Other inputs have an effect, but the primary impact on the major control modes is the DC bus voltage (Vdc). Low DC bus voltage places a constraint on the ability of the motor controller to provide optimum performance. In addition, this will not only cause inverter/motor power factor discrepancy, but also system instability near the DC bus voltage limit due to the current regulator saturation.

The advanced controller 300 enables optimal system operation under different input conditions and different operating points. The advanced controller 300 considers three basic optimization criteria that indicate three primary operating states within a full system operating area that covers the entire speed range, voltage range and current range of the AC motor drive system 100. With this control optimization, the system changes from one operating state to another smoothly and automatically when the defined condition has been met. The applied optimization criteria indicates the following primary states:

Free Regulation State—Achieve maximum torque/ampere control to maximize the system efficiency under free regulating conditions when both the inverter voltage and current are not limited.

Voltage Limiting State—Maximize the voltage utilization with optimum (minimized) current to meet the speed requirement after the operating point reaches the maximum output voltage limit.

Voltage and Current Limit State—Maximize the motor speed, therefor the maximum output power, after the operating point reaches the condition where both the maximum output voltage and inverter output current are limited.

The state machine 160 identifies abnormal operating conditions based on available inputs, such as DC bus disturbances (power interruption or other transient), over-speed (may be introduced by load surge or other abnormal dynamics), and over-current (any transient or any short circuit in the system). The state machine 160 outputs control signals to the advanced controller 300 indicating what defined abnormal mode the system should operate under for that detected abnormal condition, such as generating mode (described below) or zero torque current mode (described below), etc., to make the system "tolerant" to these abnormal transients instead of shutting the system down. One purpose of the advanced current controller 300 is to maintain the current regulation and not to shut down the IGBT gating (in an exemplary implementation of the inverter 115) under a wide variety of abnormal operating conditions, unless a critical fault is detected. The transitions between operating modes can be very smooth using the techniques implemented in the advanced controller 300 so that the impact on the motor operation is minimized.

The intelligent state machine 160 detects the operating condition inputs and sets the advanced controller 300 into an appropriate protection control mode for any detected abnormal condition. In one implementation, the state machine 160 is a logic control unit that controls the system operating sequence and operating mode according to a command from the external interface 145 (such as user interface panel or higher level computer), and from operating condition/fault detection circuitry inside.

The advanced controller 300 then provides the output current control, Vdq_ref, based on the selected control state. The advanced control technique, in which the intelligent state machine 160 works together with the advanced controller 300, enables the most appropriate control under the various steady state and transient operating situations that a high power AC motor drive may encounter. As a result, not only is the system performance robust, reliable and smooth, but also the performance is optimized to meet the high efficiency and high power density requirements of the particular application, e.g., an aerospace application.

A detailed explanation of the advanced control structure is next provided with reference to a specific implementation of applying this control technique in a 100 kW synchronous motor drive. It should be recognized, however, that principles of the present invention are applicable to other systems.

Speed Regulator 170: The speed regulator 170 may be implemented using a known type of speed regulator. The input of the speed regulator 170 is the difference between speed command (speed-ref) and speed feedback. The output of the speed regulator 170 creates the primary q-axis current (torque current) reference, Iq_ref_1. The speed feedback can be a signal from a motor speed/position sensor, or from a speed estimator 210 that performs sensorless speed estimation. Speed control is a principle task of any conventional motor drive system under normal operating conditions. In the free regulating state, where both voltage and current are not limited, the d-axis reference current is zero, and the torque current demand Iq_ref_1 becomes the only target that the inverter output voltage needs to satisfy. The maximum torque/ampere, or maximum system efficiency is achieved in this control state.

Power Interruption Regulator 180: The advanced controller 300 may be required to provide a ride-through capability when input power has been lost for an extended period of time while the system is running. With advanced control, the motor 110 will be switched to a generating mode from motoring mode under this condition. The inverter 115 then operates as an active rectifier. During this operating mode, the AC motor 110 shaft energy is used to maintain the DC bus voltage at a slightly higher level than the motoring mode until the input returns and normal operation can resume.

Figure 2:
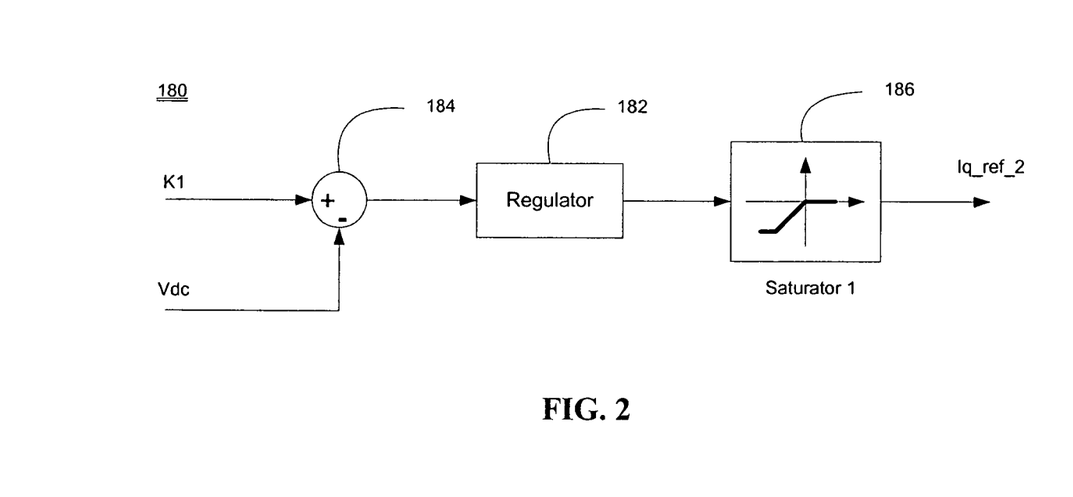
FIG. 2 is a block diagram illustrating a power interruption regulator used in the motor drive system of FIG. 1 in accordance with an embodiment of the present invention.

FIG. 2 is a block diagram illustrating a power interruption regulator 180 used in the motor drive system of FIG. 1 according to an embodiment of the present invention. The input of the power interruption regulator 180 is DC bus voltage, Vdc, sensed at a DC link capacitor. The power interruption regulator output is the second part of q-axis current reference Iq_ref_2. The state machine 160 detects the power interruption condition and sends a power interruption indicator, Power_inter, to advanced controller 300. The power interruption regulator 180 output is activated only when the value of Power_inter is 1 (Also see the detailed description of advanced controller shown in FIG. 6 for how the Power_inter functions). In order to detect a power interruption condition, another DC bus voltage, Vdc_in, sensed before the inverter input blocking diodes 118 is used.

The power interruption regulator 180 includes: a power interruption regulator 182; a comparator 184; and a saturator 186. The function of the power interruption regulator 180 is to create a minus q-axis generating current to charge a DC link capacitor and maintain the DC bus voltage at a certain level (K1) during the power interruption (Voltage level K1=575V is chosen in the implementation). The level is slightly higher than the nominal dc input voltage, e.g., 540V in this exemplary implementation. This is done to limit the inrush current when the input power recovers. The function of the saturator 186 is to limit the regulator 182 output only in the negative range under the maximum system allowable regeneration current. The control logic of the power interruption indicator, Power_inter, will be described in the explanation of advanced controller in FIG. 6.

Figure 3:
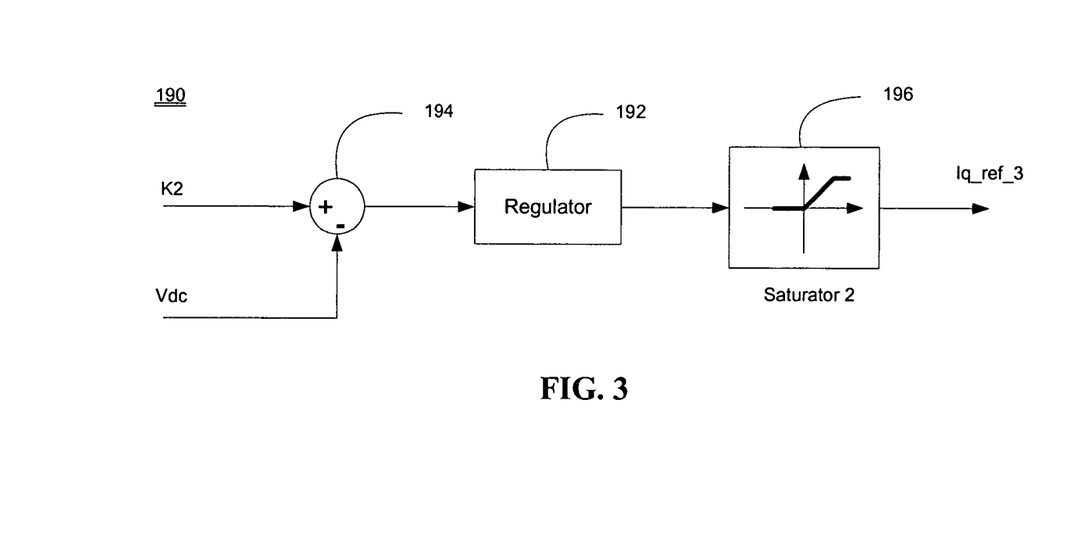
FIG. 3 is a block diagram illustrating a max DC link voltage regulator used in the motor drive system of FIG. 1 in accordance with an embodiment of the present invention.

Max DC Link Voltage Regulator (190): The max DC link voltage regulator 190 manages the energy flow between source and load during the transition between two different operating modes, such as between motoring mode and generating mode, or between normal operating mode and zero current mode, to prevent over voltage on the DC link capacitor. A DC link capacitor with a higher capacitance value will have better ability to tolerate these transitions. However, it is not typically worthwhile trading off the inverter size and weight just to deal with these transients, for the DC link capacitor bank is the most bulky component inside the inverter. When the DC link voltage is detected higher than a predefined threshold (which is application dependent), the max DC link voltage regulator 190 will operate so that a torque current will be commanded to release the extra energy in the DC link capacitor to the load. FIG. 3 shows the block diagram of the implemented max DC link voltage regulator 190 in 100 kW PMSM motor drive, and includes: a max DC link voltage regulator 192; a comparator 194 and a saturator 196. The inputs to the max DC link regulator 190 are the DC link voltage feedback and the predefined threshold K2 (e.g., K2=600V). The function of the saturator 196 is to limit regulator 192 output in the positive range within the maximum system allowable current (torque current only). The output forms the third portion of the q-axis current reference, Iq_ref_3.

Figure 4:
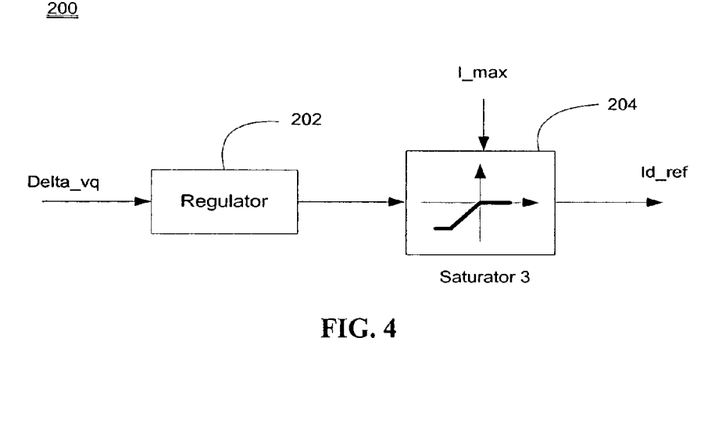
FIG. 4 is a block diagram illustrating a field weakening regulator used in the motor drive system of FIG. 1 in accordance with an embodiment of the present invention.

Field Weakening Regulator (200): Field weakening regulator 200 is used to generate field weakening minus d-axis current. This current is required only when the output voltage demand is approaching the real-time achievable voltage limit. Under this condition, the motor will no longer be able to work in the state of maximum torque/amp control due to the involvement of reactive current component, -Id. The target of the field weakening regulator 200 is to maintain the operation along the voltage limit track using as low-Id as possible to meet the speed requirement, therefore to provide maximum output power within the system capability. FIG. 4 is a block diagram of the field weakening regulator 200 in the 100 KW PMSM motor drive. The field weakening regulator 200 includes: a field weakening regulator 202; a uni-direction saturator 204; The input to the regulator is Delta_Vq. It is q-axis voltage limit indicator from the advanced controller 300, the value can be +1 or −1; the saturator 204 is to allow minus Id_ref (field weakening current) only. The output is the field weakening current reference, Id_ref. The logic of generating voltage limit indicator, Delta_Vq, to activate field weakening operation (voltage limit operation state) is described in the advanced controller shown in FIG. 6.

Figure 5:
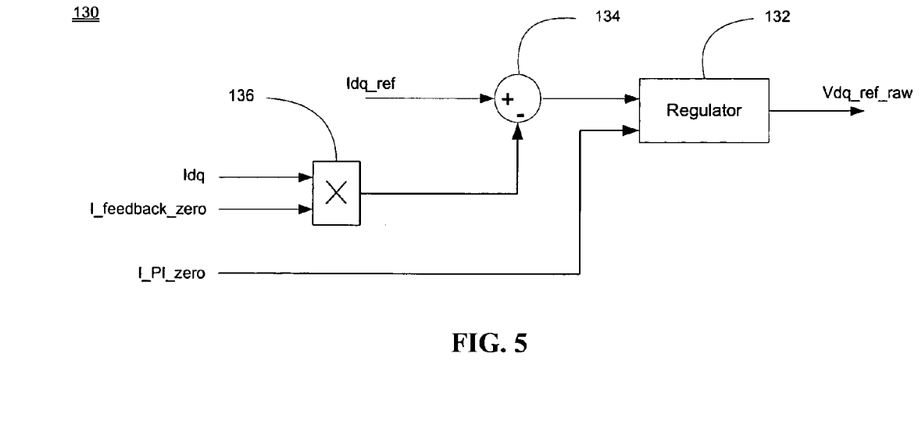
FIG. 5 is a block diagram illustrating a current regulator used in the motor drive system of FIG. 1 in accordance with an embodiment of the present invention.

Current Regulator 130: The current regulator 130 can be any type of current regulator as commonly understood. FIG. 5 is a block diagram of an implementation according to an embodiment of the present invention.

The inputs to the current regulator 130 are the current reference Idq_ref from advanced controller 300 and inverter output current feedback Idq. The output of the current regulator 130 is the initial voltage demanding, Vdq_ref_raw. Another two logic signals from the state machine are applied to exert a proper sequence for a ideal coordination based on the external start/stop commend. I_feedback_zero is to control the activation of the feedback current via a multiplier 136, and I_PI_zero is to control the enable/disable of the current regulator 132.

Zero Current Mode Unit: The zero current mode control/detection unit (located in the state machine 160) forces the value of ultimate torque reference current, Iq_ref_1+Iq_ref_2, to zero instead of shutting down the IGBT gating during fault protection (such as over current, over voltage, or over speed) or motor deceleration. In this way, the current loop regulation is still maintained, and the system is still under control and under tracked. Therefore, the normal operating mode will be resumed instantaneously when the detected abnormal condition goes away. This control mode provides a motor drive with "Flying-run" capability at any time while the system is running and increases the system's transient tolerances. It makes the system operation more robust and more reliable. This feature is especially significant to the system using sensorless control, as the controller will lose the motor speed/position track after shutting down the IGBT gating. Zero reference current command is sent to advanced controller 300 by the state machine 160 according to RUN_STOP_Cond operation command and fault detection condition.

Figure 6:
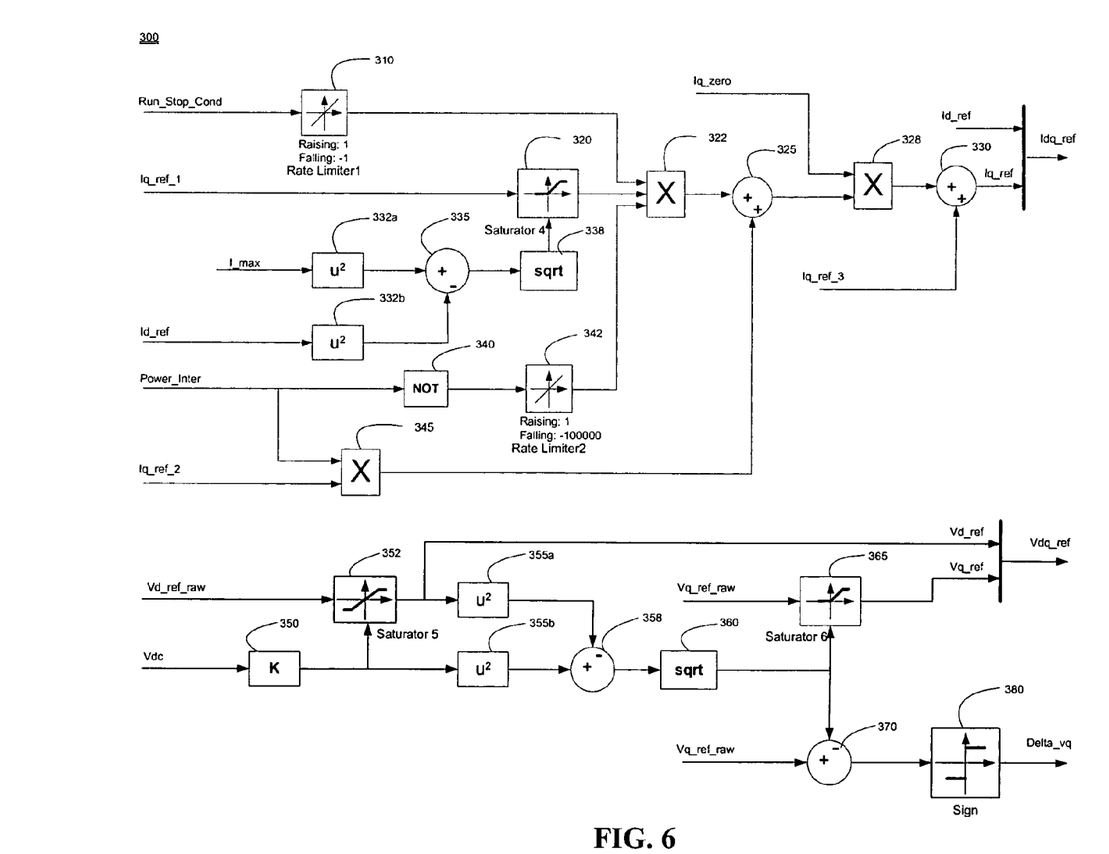
FIG. 6 is a block diagram illustrating an advanced current controller used in the motor drive system of FIG. 1 in accordance with an embodiment of the present invention.

Advanced Controller (300): The advanced controller 300 is designed to provide the optimized control on the inverter output current according to the real-time system operating conditions and dynamic abnormal mode identified by the state machine 160. The controller has two major tasks: one is to provide ultimate current reference Idq_ref to the current regulator 130, and the other is to provide intelligent voltage limit control. It also generates a voltage limit indicator, Delta_Vq, which is the input of the field weakening regulator 200.

FIG. 6 shows an implementation example of the advanced current control concept in a 100 kW PMSM motor drive according to an embodiment of the present invention. The control-related inputs/output in FIG. 6 are:

Input:

Iq_ref_1: q axis current reference, from speed regulator 170.

Iq_ref_2: q axis current reference, from power interruption regulator 180.

Iq_ref_3: q axis current reference, from max DC link voltage regulator 190.

Id_ref: d axis current reference, from field weakening regulator 200.

I_max: Pre-defined drive system maximum current

Power_inter: Power interruption indictor, from state machine 160.

Run_Stop_Cond: Conditioned Run/Stop command from a Start/Stop sequencing module in the state machine 160.

Iq_zero Zero torque current command, from state machine 160.

Vd_ref_raw d-axis voltage reference, from Id current regulator 130.

Vq_ref_raw q-axis voltage reference, from Iq current regulator 130.

Vdc DC link capacitor voltage feedback.

Output:

I dq_ref: Inverter output current reference, to current regulator 130.

Vdq_ref: Inverter output voltage reference, to PWM generation and switch driver module 120 via dq-to-abc converter 125.

Delta_Vq q-axis voltage limit indicator, to field weakening regulator 200.

The functional elements for generating the output of the advanced controller, current reference Idq_ref, in FIG. 6 are described below:

Element 310: Rate Limiter 1, to ramp-up/down Iq_ref_1 following the built-in ratings, based on the value of the Run_Stop_Cond.

Elements 332a, 332b, 335, 338: mathematic operators for calculating the maximum torque current: $I_{q\_max} = \sqrt{I_{max}^2 - I_{d\_ref}^2}$.

Element 320: Uni-direction saturator to limit the Iq_ref1 in the positive range under the maximum torque Iq_max.

Element 322: A multiplier to exert specified scalings and enable/disable control on to the reference torque I_q_ref_1, based on the values of Power_inter (0 or 1) and Run_Stop_Cond.

Element 340: A logic NOT operator to negate the logic value of Power_inter for disabling the Iq_ref_1 in power interruption.

Element 342: Rate Limiter 2, with different rising and falling rates for controlling different transition processes between generator mode and motor mode.

Element 345: A multiplier to enable/disable power interruption current, Iq_ref_2 according to the value of the power interruption indicator, Power_inter (0 or 1).

Element 325: a sum operator to take the summation of Iq_ref_1 and Iq_ref_2, only one is activated at a time depending on the value of Power_inter.

Element 328: a multiplier which will force the Iq_ref_1 or Iq_ref_2 to zero by multiplying the zero value of Iq_zero which is the zero current mode indicator from the state machine.

Element 330: a sum operator for a summation of 328 output with Iq_ref_3 to get the eventual reference torque current Iq_ref. There is no enable/disable trigger applied on the Iq_ref_3 which is the output of the max DC voltage regulator. The control logic is that, as long as the DC bus voltage is higher than the specified maximum threshold, the torque current demanding should be placed with no condition.

The function of the Idq_ref circuit is to provide Id_ref and Iq_ref to the current regulator 130. It works in the following scenario:

Iq_ref_1 from the speed regulator 170 is enabled after the value of Run_Stop_Cond command is 1, if two inputs from State Machine: Iq_zero=1, and Power_inter=0;

Iq_ref_2 from power interruption regulator 180 is enabled and at the same time Iq_ref_1 is disabled after RUN command, if Power_inter=1. It generats minus torque current command, which indicates generating mode operation. The different rising rate and falling rate of rate limiter2 is used to control the different transition process. The falling rate is much faster, which means the transition from motoring mode to generating mode happens very quickly to minimize the DC bus voltage drop when a power interruption is detected. In one implementation, the raising rate is much slower, which means the transition from generating mode to motoring mode happens with a slower slope. This is done to reduce inrush current when DC power supply recovers. In another implementation, this transition is done quickly;

Iq_ref1_1+Iq_ref1_2 will be forced to zero if Iq_zero=0;

Id_ref from field weakening regulator 200 will be non zero if the system is running in the voltage limit state. A field weakening current will be commanded/controlled by the indicator Delta_Vq; and Iq_ref_3 from max DC link voltage regulator 190 will be non-zero if the DC link voltage reaches a predefined maximum voltage threshold.

With reference to FIG. 6, the functional elements for generating another output of the advanced controller, voltage reference Vdq_ref, are described below:

Element 352: Saturator 5 to limit the original d-axis voltage demanding from current regulator 130, Vd_ref_raw, under the maximum available DC bus voltage at the time. The Output is the d-axis voltage reference, Vd_ref, which goes to the PWM generation.

Element 350: A constant factor to define the maximum modulation index from DC to AC which usually depends on what PWM generation method is applied. The output is the inverter maximum AC voltage Vmax.

Elements 355*a*, 355*b*, 358, 360: Mathematical operators to calculate the maximum q-axis voltage limit. $V_{q\_max} = \sqrt{V_{max}^2 - V_{d\_ref}^2}$ Element 365: Uni-direction saturator 6 to limit the q-axis reference voltage lower than the Vq_max. Element 370, 380: Mathematic sum operator 370 and logic operator 380 make up the function block to generate q-axis voltage limiter, Delta_Vq, which indicates the system voltage limit operating state. It is the input of the field weakening regulator and performs the following function:

| If | Vq_ref_raw ≤ Vq_max, | then Delta_Vq = +1 |
|---|---|---|
| Otherwise, | Vq_ref_raw > Vq_max, | then Delta_Vq = −1 |

The function of the Vdq_ref circuit is to provide eventual voltage command, Vd_ref and Vq_ref for PWM generator 120. It works in the following scenario:

The voltage reference circuit implements the voltage limit control on the original voltage demanding from the current regulator. The function of the voltage limit control is to provide a voltage limit to the voltage reference according to the sensed DC link voltage and the required d-component voltage to ensure that the issued voltage command is always within the maximum achievable voltage. This is done by properly commanding field weakening current. In this way, there will be no over modulation, and the potential instability problem caused by current controller saturation is avoided. The maximum inverter voltage Vmax is calculated from the DC link voltage feedback. The idea is to put d-axis voltage demand in higher priority to ensure a solid airgap field under varied DC bus condition, which means Vd_max is only limited by Vdc. The voltage limit mechanism is explained below:

$Vd\_ref^2 + Vq\_ref^2 \leq Vmax^2$, where Vmax is system maximum achievable voltage;

The demand of Vd_ref will be met first to achieve a solid air gap flux control at any time during steady state and transient. The limit on Vd_ref is only the Vmax The limit on Vq_ref is calculated: $maxV_{q\_ref} = \sqrt{V_{max}^2 - V_{d\_ref}^2}$ The Delta_Vq=−1, if Vq_ref_raw≧Vq_ref limit. The field weakening control will be activated. Otherwise, Delta_Vq=+1.

With this control scheme, provided by the advanced controller 300, not only the operation of the drive system is optimized, but also the operation is appropriately limited within the system allowable operating area (maximum voltage, maximum current, maximum speed, maximum temperature . . . ) under different normal/abnormal operating conditions. Therefore a robust and reliable system operation is achieved.

Figure 7:
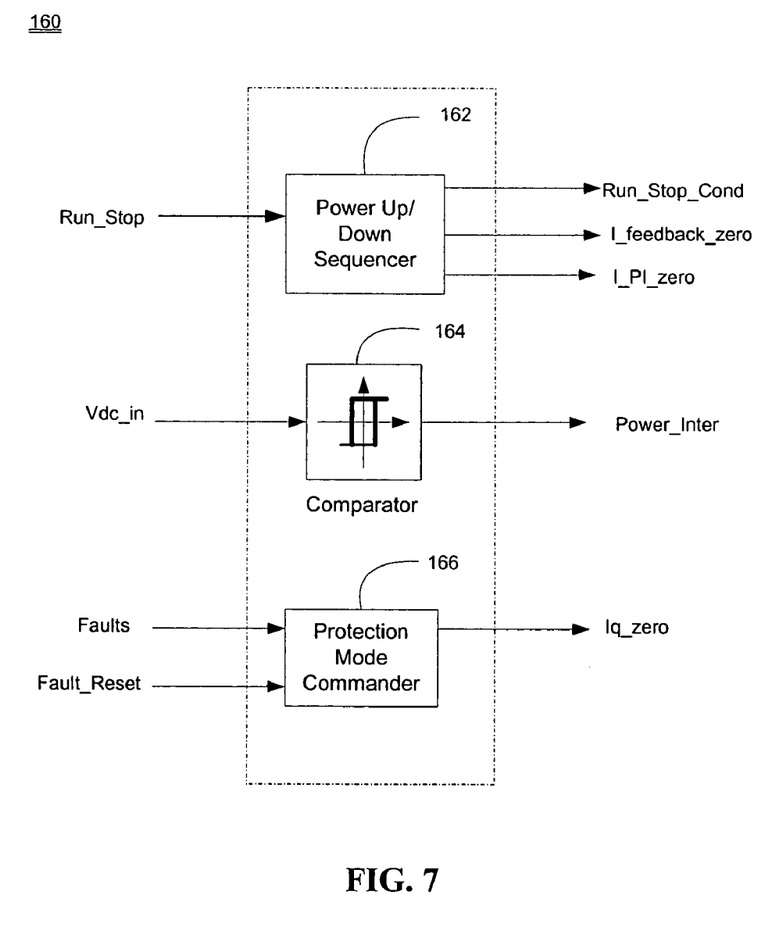
FIG. 7 is a block diagram illustrating an intelligent state machine used in the motor drive system of FIG. 1 in accordance with an embodiment of the present invention.

FIG. 7 is a conceptual function block diagram of state machine 160, which generally illustrates the inputs to the state machine 160 and the outputs to the advanced controller 300 for setting an operation mode. Four operating modes: normal mode; power interruption mode; fault protection mode; and power-up/down dynamic mode are indicated. The functional units inside the state machine are explained below.

Power Up/Down Sequencer 162: The unit provides sequencing control in any system power-up and power-down processes including normal or abnormal operations to properly apply commands and set/reset current regulator. The output, Run_Stop_Cond, goes to the advanced controller 300 for enabling the reference current control. The other two outputs, I_feedback_zero and I_PI_zero, are fed into the current regulator 130 for enabling the feedback current and to set/reset the current regulator respectively. In this way, the start/stop dynamic process are well controlled to perform as expected.

Power interruption detector 164: When DC input voltage is lower than 450V (predefined according to the application), the indicator, Power_inter, will switch from 0 to 1. The output of power interruption regulator 182, Iq_ref_2, will then be activated by the element 345 in the advanced controller 300 in FIG. 6. Similarly, when the detected DC input voltage is above 500V, the indicator Power_inter will switch from 1 to 0, power Interruption output Iq_ref_2 will be disabled.

Protection Mode Commander 166: the unit receives various system fault detections and decides weather or not a fault protection mode should be set by setting the output Iq_zero to 0 or 1. The output Iq_zero goes to the advanced controller 300 for it to command the zero torque current operation mode.

Normal operating mode: the normal operating mode is defined as no fault indications from the state machine 160, which is the following condition:

| | |
|---|---|
| Run_Stop_Cond: | 1 |
| Power_inter: | 0 |
| Iq_zero: | 1 |

Although, an embodiment of the present invention have been described above in the context of a particular AC motor drive system environment, it should be recognized that variations on this motor drive system are possible without departing from the scope of the appended claims.

We claim:

1. An apparatus for controlling a power converter of an AC motor drive system, said power converter outputting multi-phase AC current to an AC motor, said apparatus comprising:

a state selecting unit for selecting an operation mode, from among a plurality of operation modes, for said AC motor based on system real-time operating conditions, the plurality of operation modes including a normal mode, a power interruption mode, a fault protection mode, and a power-up/down dynamic mode, said system operating conditions including DC voltage available to said power converter, motor load condition, and motor speed command; and an advanced controller for controlling multi-phase AC current output from said power converter to said motor in accordance with the operation mode selected by said state selecting unit, said advanced controller generating a current control reference value that is based on the selected operation mode to achieve current control under various operating conditions of said motor drive system.

2. The apparatus according to claim 1, wherein, in said normal operation mode, said advanced controller generates the current control reference value in accordance with an optimization control algorithm, which sets an operation state from among a plurality of operation states according to an actual operating point of the system, the plurality of operation states including a free regulation state, a voltage limiting state, and a voltage and current limiting state, each operation state being associated with a corresponding optimization control algorithm.

3. The apparatus according to claim 1, wherein said apparatus further comprises:

a speed regulator for generating a torque current reference, $I_q ref_1$, based on a difference between a commanded motor speed and speed feedback.

4. The apparatus according to claim 3, wherein said current controller generates said current control reference value, during said normal operation mode, based on said torque current reference, $I_q ref_1$.

5. The apparatus according to claim 1, wherein said apparatus further comprises a power interruption regulator for generating a power interruption current reference, $I_q ref_2$, during said power interruption mode, wherein said current controller generates said current control reference value, during said power interruption mode, based on said power interruption current reference, $I_q ref_2$, thereby controlling said motor to operate as a generator for charging a DC bus.

6. The apparatus according to claim 1, wherein said apparatus further comprises a max DC link voltage regulator for generating a voltage regulating current control reference, $I_q ref_3$, wherein said current controller generates said current control reference value, during transients, based on said voltage regulating current control reference, $I_q ref_3$, thereby preventing an over voltage condition on a DC link capacitor.

7. The apparatus according to claim 2, wherein said apparatus further comprises a field weakening regulator for generating a field weakening current control reference, $I_d ref$, wherein said current controller generates said current control reference value, during said voltage limiting state, based on said field weakening current control reference, $I_d ref$, thereby maintaining operation of said AC motor system within voltage limits.

8. The apparatus according to claim 1, wherein said apparatus further comprises a zero mode control unit for generate a zero mode current control reference, $I_q zero$, during said fault protection mode, wherein said current controller generates said current control reference value, during said fault protection mode, based on said zero mode current control reference, $I_q zero$, thereby reducing torque current to substantially zero without shutting down operation of said power converter.

9. The apparatus according to claim 1, wherein said apparatus further comprises:

a speed regulator for generating a torque current reference, $I_q ref_1$, based on a difference between a commanded motor speed and a feedback speed value, a power interruption regulator for generating a power interruption current reference, $I_q ref_2$, during said power interruption mode;

a max DC link voltage regulator for generating a voltage regulating current control reference, $I_q ref_3$;

a field weakening regulator for generating a field weakening current control reference, $I_d ref$; and a zero current mode regulator for generating a zero mode current control reference, $I_q zero$, during said fault protection mode, wherein said current controller selects current control reference values based on outputs of said speed regulator, said power interruption regulator, said DC link voltage regulator, said field weakening regulator, and said zero current mode regulator.

10. The apparatus according to claim 1, wherein said AC motor is an AC synchronous motor and said power converter is a voltage source inverter.

11. The apparatus according to claim 1, wherein said AC motor drive system is an aerospace motor drive system.

12. A method of controlling a power converter of an AC motor drive system, said power converter outputting multi-phase AC current to an AC motor, said method comprising:
    selecting an operation mode, from among a plurality of operation modes, for said AC motor based on system real-time operating conditions, said plurality of operation modes including a normal mode, a power interruption mode, a fault protection mode, and a power-up/down dynamic mode, said system operating conditions including DC voltage available to said power converter, motor load condition, and motor speed command; and
    controlling multi-phase AC current output from said power converter to said motor in accordance with the selected operation mode, said step of controlling including generating a current control reference value that is based on the selected operation mode to achieve current control under various operating conditions of said motor drive system.

13. The method according to claim 12, wherein, in said normal operation mode, said controlling step generates the current control reference value in accordance with an optimization algorithm, which sets an operation state from among a plurality of operation states according to an actual operating point of the system, the plurality of operation states including a free regulation state, a voltage limiting state, and a voltage and current limiting state, each operation state being associated with a corresponding optimization control algorithm.

14. The method according to claim 1, wherein said method further comprises:
    generating a torque current reference, $I_q\text{ref}_1$, based on a difference between a commanded motor speed and speed feedback.

15. The method according to claim 14, wherein said controlling step generates said current control reference value, during said normal operation mode, based on said torque current reference, $I_q\text{ref}_1$.

16. The method according to claim 12, wherein said method further comprises generating a power interruption current reference, $I_q\text{ref}_2$, during said power interruption mode,
    wherein said controlling step generates said current control reference value, during said power interruption mode, based on said power interruption current reference, $I_q\text{ref}_2$, thereby controlling said motor to operate as a generator for charging a DC bus.

17. The method according to claim 12, wherein said method further comprises generating a voltage regulating current control reference, $I_q\text{ref}_3$,
    wherein said controlling step generates said current control reference value, during transients, based on said voltage regulating current control reference, $I_q\text{ref}_3$, thereby preventing an over voltage condition on a DC link capacitor.

18. The method according to claim 13, wherein said method further comprises generating a field weakening current control reference, $I_d\text{ref}$,
    wherein said controlling step generates said current control reference value, during said voltage limiting state, based on said field weakening current control reference, $I_d\text{ref}$, thereby maintaining operation of said AC motor system within voltage limits.

19. The method according to claim 12, wherein
    said method further comprises generating a zero mode current control reference, $I_q\text{zero}$, during said fault protection mode,
    wherein said controlling step generates said current control reference value, during said fault protection mode, based on said zero mode current control reference, $I_q\text{zero}$, thereby reducing torque current to substantially zero without shutting down operation of said power converter.

20. The method according to claim 12, wherein said method further comprises:
    generating a torque current reference, $I_q\text{ref}_1$, based on a difference between a commanded motor speed and a feedback speed value;
    generating a power interruption current reference, $I_q\text{ref}_2$, during said power interruption mode;
    generating a voltage regulating current control reference, $I_q\text{ref}_3$, during a transient state;
    generating a field weakening current control reference, $I_d\text{ref}$, during a voltage limit state; and
    generating a zero mode current control reference, $I_q\text{zero}$, during said fault protection mode,
    wherein said controlling step generates current control reference values based on said power interruption current reference, $I_q\text{ref}_1$, said power interruption current reference, $I_q\text{ref}_2$; said voltage regulating current control reference, $I_q\text{ref}_3$; said field weakening current control reference, $I_d\text{ref}$; and said zero mode current control reference, $I_q\text{zero}$.

21. An apparatus for controlling a power converter of an AC motor drive system, said power converter outputting multi-phase AC current to an AC motor, said apparatus comprising:
    a state selecting unit for selecting an operation mode, from among a plurality of operation modes, for said AC motor based on system real-time operating conditions, the plurality of operation modes including a normal mode, a power interruption mode, a fault protection mode, and a power-up/down dynamic mode, said system operating conditions including DC voltage available to said power converter, motor load condition, and motor speed command; and
    an advanced controller for controlling multi-phase AC current output from said power converter to said motor in accordance with the operation mode selected by said state selecting unit, said advanced controller generating a current control reference value that is based on the selected operation mode to achieve current control under various operating conditions of said motor drive system,
    wherein, during said fault protection mode, said controller generates a current control reference value to reduce torque current to substantially zero without shutting down operation of said power converter,
    wherein, during said power interruption mode, said controller generates a current control reference value to control said motor to operate as a generator for charging a DC bus.

* * * * *